3,370,021
SULFONIC ACID CATION EXCHANGERS
CONTAINING AMINE GROUPS
David Harry Kohn and Abraham Schwarz, Haifa, Israel, and Kurt S. Spiegler, Glastonbury, Conn., assignors to Technion Research and Development Foundation Limited, Haifa, Israel, a corporation of Israel
No Drawing. Filed Nov. 7, 1963, Ser. No. 322,024
2 Claims. (Cl. 260—2.2)

The present invention concerns ion-exchange resins.

More particularly, the invention concerns resinous cation exchangers. In the following specifications and claims the terms "ion exchange resin," "resinous cation exchanger," "cation exchanger" and the like will be used irrespective of the mechanism by which the cations are retained by the resin and exchanged for other cations.

It is the object of the present invention to provide new cation exchangers of improved properties.

A cation exchanger according to the invention is obtained by nitration of a synthetic resinous polymer or copolymer that contains acidic groups and, if desired, reduction of the resulting nitro polymer into the corresponding amino polymer.

The starting polymer or copolymer used for the production of a cation exchanger according to the invention may already be a cation exchanger per se, in which case its modification in accordance with the invention serves for improving some of its properties such as, for example, its selectivity towards a certain cation, its reactivity or the like. The acidic groups of the starting polymer or copolymer, which are retained in the final product, may for example be sulfono or carboxy radicals. Examples of starting polymers and copolymers are sulphonated polystyrene, sulphonated styrene-divinylbenzene copolymer, sulphonated phenol-formaldehyde resins, various resins with carboxy group and the like.

It has been found that in accordance with the invention it is possible to prepare cation exchangers that are selective in their cation affinity so that these exchangers are suitable for use for the selecttve removal of certain cations from solution in preference to the other cations present in the same solution.

It is known that even conventional cation exchangers exhibit a certain degree of selectivity in their cation affinities. For example, most of the conventional exchangers will exhibit a slight preference for the retention of potassium over sodium. Furthermore, between cations of different groups of the Periodic Table those of higher electrostatic charge, that is to say of higher valency, are as a rule retained by the cationic exchanger in preference over cations of a lower charge, i.e. a lower valency. However, these selectivities although they are distinctly discernible are often too moderate to be of any practical value. In view of this, attempts have already been made to produce cation exchangers of specific selectivities. Thus for example according to U.S. patent specification No. 2,619,404 a K-selective cation exchanger is prepared by nitrating polystyrene, reducing the resulting nitro-polymer, reacting the resulting amino polymer with picryl chloride and further nitrating the product of this reaction. This sequence of reactions can be represented by the following reaction scheme:

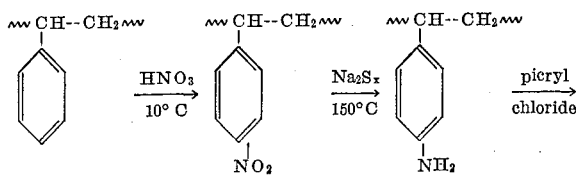

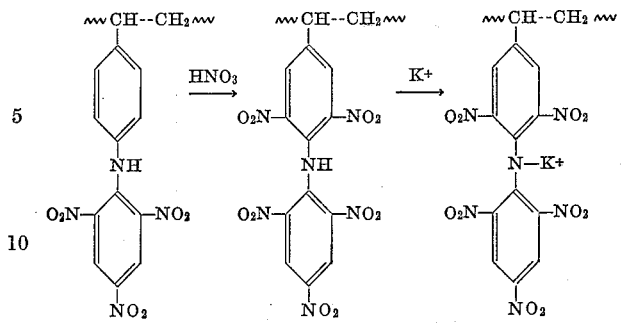

As can be seen the final product contains as reactive, cation-retaining groups dipicryl amine radicals. Since it is known that the potassium salt of dipicryl amine is very scarcely soluble, the potassium selectivity of a resin containing a multitude of dipicryl amine radicals was to be expected. Moreover, the multitude of steps necessary for the preparation of this K-selective resin seems to render the final product expensive and therefore useless for practical purposes.

It was therefore surprising to find that improved cation exchanger resins of specific cation selectivities can be prepared from acidic resins in a single nitration operation followed, if desired, by reduction of the resulting nitro resin into the corresponding amino resin. The cation exchangers are obtained in this manner in a high yield and the specific selectivities which they exhibit are of an order which renders their application for the selective removal of specific cations from their solutions practical and economical. The nature of the specific selectivity, the rate of exchange and the separation factor depend on various factors such as the nature of the starting material, the conditions of the nitration and the pH at which the exchange reaction is effected.

It should be noted that the nitrated and aminated cation exchangers according to the invention are of a different nature than the known K-selective exchanger described above. Whereas the latter includes, as already mentioned, as sole reactive groups a multitude of dipicryl amine radicals and the K-preference of the exchanger is based on the known affinity of the dipicryl amine to potassium, the exchangers according to the invention contain nitro groups and/or amino groups together with acidic radicals and the cation retaining capacity of the exchanger is accordingly based on a different mechanism.

The invention is illustrated by the following examples without being limited thereto.

Example 1.—Preparation of a K-selective cation exchanger from styrene-divinylbenzene copolymer sulphonic acid (Amberlite IR 120—Trademark)

In a three-necked flask, provided with stirrer, thermometer and dropping funnel, 90 g. of the above air-dried cation-exchange resin in its H-form was treated for 10 hours with a nitrating mixture composed of 1400 g. of 95% $H_2SO_4$ and 350 g. of 90% $HNO_3$ at various constant temperatures as given in Table 1 below.

After completion of the reaction, the granular product was separated from the reaction mixture. The product was neutralized with a 25% by weight aqueous solution of NaOH and water was added. The resin, which was dark coloured in its Na-form, was washed several times with water and repeatedly transferred from its Na-form to its H-form and back to its Na-form with 2N HCl and 2N NaOH, respectively. This procedure was repeated until the NaOH washings became colourless and free from any yellow colour. The yield in each batch was about 85 g. of nitrated resin.

The results obtained with three different batches at different temperature are summarized in the following Table I. In addition to the chemical analyses of the products as given in the table, the presence of $NO_2$-groups was confirmed by infra-red spectra. The structure of the nitrated resin was about as follows:

—CH—$CH_2$—CH—$CH_2$— | —CH—$CH_2$— | —CH—$CH_2$—
    |           |              |              |
  $C_6H_3$    $C_6H_3$       $C_6H_4$       $C_6H_4$
  ($SO_3H$,   ($NO_2$,        ($NO_2$)       ($NO_2$)
   $NO_2$)    $SO_3H$)        $NO_2$          $NO_2$

52% | 24% | 24%

TABLE I

| No. of experiment | Reaction time, hrs. | Temperature, °C. | $Q_h$ | Weight percent of element in the dry resin in its H-form | | | | |
|---|---|---|---|---|---|---|---|---|
| | | | | Carbon | Hydrogen | Oxygen[1] | Sulphur | Nitrogen |
| 1 | 10 | 95 | 2.49 | 45.50 | 3.12 | 36.08 | 5.42 | 9.69 |
| 2 | 10 | 50 | 2.60 | 44.12 | 3.47 | 36.68 | 7.30 | 8.09 |
| 3 | 10 | 25 | 2.45 | 44.01 | 3.51 | 36.82 | 7.58 | 7.93 |
| Cation exchange resin untreated | | | 4.82 | 49.94 | 5.14 | 30.05 | 15.09 | 0.13 |

[1] Determined by chemical analysis.
$Q_h$ = Exchange capacity in milliequivalents per gr. of dry resin as determined by tritation with KOH.

The nitrated resins obtained in this manner were found to be of a pronounced K-selectivity. This was established by the following experiments:

(a) *Potassium-hydrogen exchange.*—The H-K exchange of the nitrated resins was studied on the reaction $RH + K \rightarrow RK + H$ using aqueous solutions of $KNO_3$ together with $HNO_3$ at constant anion concentration of 0.1 molar. Four different solutions were used and these were introduced in four identical vessels containing the same amount of the same resin in its H form. The result of the experiments under equilibrium condition are summarized in the following Table II:

TABLE II

| $K_H^K$ | $\overline{X}_K$ | $X_K$ |
|---|---|---|
| 2.6 | 0.77 | 0.56 |
| 3.1 | 0.61 | 0.34 |
| 3.7 | 0.5 | 0.21 |
| 4.2 | 0.24 | 0.07 |

In this table $$K_H^K$$

is the selectivity coefficient defined by the equation $$K_H^K = \frac{\overline{X}_K \cdot X_H}{\overline{X}_H \cdot X_K}$$

where $\overline{X}_K$ and $\overline{X}_H$ are, respectively, the mole fractions of K and H in the resin, and $X_K$ and $X_H$ are, respectively, the mole fractions of K and H in the solution.

In contrast to these results the non-nitrated Amberlite IR 120 resin serving as starting material in the production of the nitro resins as specified hereinabove manifests a K-selectivity $$K_H^K = 1.8$$

at a potassium mole fraction of 0.95 in the solution, and a $$K_H^K = 2.2$$

when the potassium mole fraction in the solution is decreased to 0.1. It is thus seen that the K-selectivity of the nitrated resin prepared in accordance with the example is considerably improved.

(b) *Na-K exchange.*—The nitrated cation-exchanger in its Na-form was brought into equilibrium with a solution containing equimolar quantities of $NaNO_3$ and $KNO_3$ (total cation concentration: 0.01 mole).

After completion of the exchange reaction, the resin was analyzed for its Na and K content. The result showed enrichment of K in the resin by a factor of 2.2 (i.e. it contained 2.2 more K than Na).

For comparison, the Amberlite IR 120 cation-exchange resin has a factor of about 1.4 whereas a resin of the dipicrylamine-type has a factor of 2.7.

The rate of the cation-exchange was of the same order as of Amberlite IR 120.

EXAMPLE 2.—*Reduction of the nitro-resin obtained according to Example 1*

The reduction of nitrated polystyrene-sulphonic acid was carried out with $SnCl_2$ in HCl-solution. This method ensures the selective reduction of the $NO_2$-groups to —$NH_2$ only without simultaneous reduction of the $SO_3H$-groups or the aromatic rings.

The reduction was carried out as follows: The nitrated polystyrene-sulphonic acid (20 gr.) in its H-form, having an N-content of 7.93% (0.113 mole) was added to a solution of $SnCl_2 \cdot 2H_2O$ (115 gr.; 0.51 mole) in concentrated HCl (400 gr.) and the mixture refluxed while stirring for ten hours. Then the solution was decanted off and the solid material left washed with diluted HCl (2N) until no more $SnCl_2$ appeared in the effluent. Thereafter the resin was repeatedly transformed into its Na-form and back into its H-form and washed with water, until no more chloride was detectable. The pH of the wash water at this stage was 4.9. The resin was dried over $P_2O_5$. Yield: 15.5 gr.

As starting materials, the three different resins of Example 1 were used and the result of the chemical analysis of the product is summarized in the following Table III

TABLE III

| Resin | Carbon, percent | Hydrogen, percent | Chlorine, percent | Oxygen[1] | Sulphur | Nitrogen |
|---|---|---|---|---|---|---|
| Cation-exchange resin[2] | 49.94 | 5.14 | | 30.05 | 15.09 | 0.13 |
| Nitrated c.e.r.[3] | 44.01 | 3.51 | | 36.82 | 7.58 | 7.93 |
| Above nitrated resin after reduction | 52.42 | 5.65 | 2.08 | 20.17 | 10.02 | 8.79 |

[1] Determined by chemical analysis.
[2] Starting material.
[3] Exp. No. 3 Table 1.

The amino-polystyrene sulphonic acid obtained in this manner exhibited at certain pH ranges a very strong affinity to copper and nickel ions. In the following Tables IV and V the capacity of such a resin to retain copper and nickel ions at various molar concentrations and in dependence of the pH and the total ionic strength of the solution is summarized. The solutions used were buffer solutions based on ammonium acetate and pH adjustments were affected by the addition of HCl or NaOH, as required. The distribution coefficient $K_d$ appearing in the tables is defined as follows:

$$K_d = \frac{\text{quantity of an ion A in resin} \times \text{volume of solution in ml.}}{\text{weight of dry resin in H-form} \times \text{quantity of ion A in solution}}$$

where A is the ion that is being exchanged.

TABLE IV

| Starting Concentration | $Cu^{++}:1\times10^{-3}$ M | | | | | $Cu^{++}:5\times10^{-3}$ M | | | | | |
|---|---|---|---|---|---|---|---|---|---|---|---|
| pH | 1.70 | 2.30 | 3.55 | 4.40 | 5.75 | 1.72 | 2.43 | 3.45 | 4.30 | 5.0 | 5.95 |
| Ionic strength of solution | 0.065 | 0.055 | 0.050 | 0.065 | 0.090 | 0.065 | 0.055 | 0.050 | 0.065 | 0.080 | 0.100 |
| $K_d$ [1] | 4.92 | 29.2 | 527 | 2,060 | 2,050 | 4.92 | 18 | 159 | 538 | 1,160 | 2,360 |
| Percent $Cu^{++}$ removed from solution [1] | 0.0 | 30 | 85 | 95 | 95 | 4.4 | 18 | 62 | 88 | 96 | 96 |

TABLE V

| Starting Concentration | $Ni^{++}:1\times10^{-3}$ M | | | | | | | | | $Ni^{++}:5\times10^{-3}$ M | | | | | | |
|---|---|---|---|---|---|---|---|---|---|---|---|---|---|---|---|---|
| pH | 1.75 | 2.55 | 3.70 | 4.49 | 5.22 | 5.95 | 7.10 | 8.02 | 9.60 | 1.80 | 2.52 | 3.61 | 4.45 | 5.15 | 5.88 | 6.40 |
| Ionic strength of solution | 0.065 | 0.055 | 0.050 | 0.065 | 0.080 | 0.090 | 0.100 | 0.090 | 0.060 | 0.065 | 0.055 | 0.050 | 0.065 | 0.080 | 0.090 | 0.100 |
| $K_d$ [1] | 4 | 4 | 70 | 312 | 893 | 2,672 | 2,660 | 2,720 | 2,370 | 7 | 32 | 77 | 185 | 322 | 673 | 1,098 |
| Percent $Ni^{++}$ removed from solution [1] | 4 | 4 | 40 | 75 | 90 | 99 | 99 | 99 | 99 | 6 | 13 | 42.2 | 66 | 76 | 86 | 92 |

[1] Minimum value.

As can be seen from the foregoing tables, $K_d$ for copper at pH 3.55 is 527 whereas $K_d$ for nickel at pH 3.70 is only 70. It can thus be concluded that at this pH range the aminated resin exhibits a pronounced preference for copper over nickel, the $$K_{Ni}^{Cu}$$

being approximately $$\frac{527}{70} = 7.5$$

In addition to the fact that the cation exchanger of the present invention exhibits specific cation-selectivities that are considerably more pronounced than the general preference of conventional exchangers for heavy ions and ions with a high electrostatic load, it has been found that the selectivities are largely independent of the ionic strength of the solution. Thus, for example, the $K_d$ for system comprising the above aminated exchanger and a $5\times10^{-3}$ M Cu-solution is substantially the same for an ionic strength of 0.09 mole and 1 mole, as shown in the following Table VI:

TABLE VI

| Starting concentration of $Cu^{++}$ in solution | $5\times10^{-3}$ M | $5\times10^{-3}$ M |
|---|---|---|
| Ionic strength in solution | 0.090 M | 1 M |
| pH | 5.60 | 5.52 |
| $K_d$ [1] | 2,502 | 3,450 |
| Percent $Cu^{++}$ removed [1] from solution | 96 | 98 |

[1] Minimum value.

The cation exchangers of the present invention also excel in their rate of ion exchange. This is demonstrated for example by one following experiment:

The aminated resin prepared as indicated hereinbefore is treated with a solution containing $3\times10^{-2}$ mole/litre of Zn ions and having a pH of 4.50 to 4.70. After 5 minutes 75% of the Zn ions present in the starting solution were bound to the aminated resin. A corresponding experiment was carried out under the same conditions with the same solution using Dowex A–1 (trademark) resin. In this case the binding of 75% of the Zn to the resin took 60 minutes.

What is claimed is:

1. Resinous cation exchange substances taken from the class consisting of polystyrene and copolymers of styrene with divinylbenzene, said substances containing a plurality of sulfonic radicals, said substances containing a plurality of amino groups, and being substantially free from water.

2. A method of exchanging cations comprising providing a material as set forth in claim 1, passing an acid aqueous solution of an ion to be exchanged into contact with said material sufficiently to cause said ion to be attached to said material.

References Cited

UNITED STATES PATENTS 2,592,349  4/1952  Skogseid _____ 260—2.1
3,256,250  6/1966  Frilette _____ 260—79.3

WILLIAM H. SHORT, *Primary Examiner.*

SAMUEL H. BLECH, *Examiner.*

C. A. WENDEL, M. GOLDSTEIN, *Assistant Examiners.*